United States Patent [19]

Matsumoto et al.

[11] Patent Number: 4,646,105

[45] Date of Patent: Feb. 24, 1987

[54] LIQUID JET RECORDING METHOD

[75] Inventors: Tokio Matsumoto, Tokyo; Seiichi Aoki, Kawasaki; Hiroto Matsuda, Yokohama; Masami Ikeda, Machida; Haruyuki Matsumoto, Tokyo; Asao Saito, Yokohama, all of Japan

[73] Assignee: Canon Kabushiki Kaisha, Tokyo, Japan

[21] Appl. No.: 815,676

[22] Filed: Jan. 2, 1986

Related U.S. Application Data

[63] Continuation of Ser. No. 704,150, Feb. 21, 1985, abandoned, which is a continuation of Ser. No. 390,022, Jun. 18, 1982, abandoned.

[30] Foreign Application Priority Data

Jun. 29, 1981 [JP] Japan ............................... 56-101032
Jul. 10, 1981 [JP] Japan ............................... 56-108726

[51] Int. Cl.[4] ............................................ G01D 15/18
[52] U.S. Cl. ................................ 346/1.1; 346/140 R
[58] Field of Search ....................... 346/1.1, 75, 140 R

[56] References Cited

U.S. PATENT DOCUMENTS

| | | | |
|---|---|---|---|
| 4,184,168 | 1/1980 | Tsayama et al. | 346/140 R |
| 4,313,124 | 1/1982 | Hana | 346/140 R |
| 4,335,389 | 6/1982 | Shirato et al. | 346/140 R |
| 4,336,548 | 6/1982 | Matsumoto | 346/140 R |
| 4,345,262 | 8/1982 | Shirato et al. | 346/140 R |
| 4,376,945 | 3/1983 | Hana et al. | 346/140 R |
| 4,417,251 | 11/1983 | Sugitani | 346/1.1 |
| 4,463,359 | 7/1984 | Ayata et al. | 346/1.1 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A liquid jet recording method using a recording head provided with a liquid jet part comprising an orifice through which the liquid is jetted to form a flying liquid droplet and a heat action section in communication with said orifice in which section the thermal energy for jetting the liquid acts on said liquid, and an electro-thermal transducer serving as means for generating the thermal energy, said method characterized in that said thermal energy is made to act on the liquid filling said heat action section so as to jet from said orifice such amount of liquid sufficient enough to include unnecessary bubbles generated in said liquid jet part and a liquid droplet is formed by said jetted liquid whereby said unnecessary bubbles are eliminated from said liquid jet part while repeating said liquid droplet formation to perform recording with said droplets. Further, said method is characterized by applying to said electro-thermal transducer a driving signal having a voltage value in the range of 1.02 to 1.3 times as high as the threshold voltage value for bubble generation in said heat action section filled with said liquid.

7 Claims, 6 Drawing Figures

LIQUID JET RECORDING METHOD

This application is a continuation of application Ser. No. 704,150 filed Feb. 21, 1985, now abandoned, which is a continuation of U.S. Ser. No. 390,022, filed June 18, 1982, now abandoned.

BACKGROUND OF THE INVENTION

1. Field of the Invention

The present invention relates to a non-impact recording method and especially to a liquid jet recording method suitable for digital copying machine, fascimile and printer.

More particularly, the present invention relates to a liquid jet recording method of the type in which the recording liquid is jetted from an orifice to form flying droplets by use of thermal energy and the droplets are deposited on the surface of a recording material.

2. Description of the Prior Art

The non-impact recording method is a very attractive recording method for its particular advantage that the noise generated during recording is negligibly small. Among various non-impact recording methods hitherto known, the liquid jet recording method (ink jet recording method) is the one having the most potential. It makes possible recording at higher speed and on any plain papers without need for any particular processing for fixing. Owing to these advantages, many attempts have been made to develop apparatus for carrying out the liquid jet recording method, some of which have already been put to practical use and some of which are now under improvement for practical use.

Among others, the liquid jet recording method as disclosed in German Laid-Open Specification (DOLS) No. 2,843,064 is attracting attention in the art. The recording method disclosed there is distinguished from other similar liquid jet recording methods in the feature that the motive force for jetting liquid droplets is obtained by applying to the liquid the thermal energy serving as droplet forming energy.

According to the recording method disclosed in the patent publication, the liquid is subjected to the action of thermal energy to cause a change of state (such as generation of air bubbles) accompanied by an abrupt increase of volume. From this change of state there is produced an acting force by which the liquid is jetted from the orifice as liquid droplets flying toward a recording material on which the droplets stick to produce a record.

An advantage of the recording method disclosed in DOLS No. 2,843,064 is that it is applicable with particular effectiveness to the so-called drop-on-demand recording process. Another advantage thereof is found in the fact that it enables one to realize a multi-orifice recording head having a plural number of orifices very closely arranged over the full line width of the recording head part. With such a multi-orifice recording head, images of high resolution and high quality can be obtained at high speed.

Although the liquid jet recording method described above has many advantages over other recording methods, it involves a problem relating to the durability of the recording head. When images of high resolution and high quality are to be recorded for a long time at higher speed than that allowable at present or when it is wished to prolong the useful life of the recording apparatus to a great extent, a further improvement of the recording head is required regarding the repeating useful life (durability) of the head.

The durability of the recording head used for carrying out the above recording method is determined by various factors. One of the factors is, of course, the life of the electro-thermal transducer used therein. Another factor is the deposition of solid matter on the surface of the transducer.

A typical structure of the recording head used for carrying out the above recording method comprises orifices provided from which to jet liquid, a liquid jet part in communication with said orifices and an electrothermal transducer. The liquid jet part has a heat action portion where thermal energy acts on the liquid to form flying liquid droplets. The electro-thermal transducer serves as means for generating the thermal energy acting on the liquid when said heat action portion is filled. The electro-thermal transducer is so disposed as to constitute a portion of the liquid flow channel and also to be in contact with the liquid introduced through an inlet at the heat action portion through a heat action surface. The heat action portion is a portion where the droplet forming energy acts. The heat action surface through which the electro-thermal transducer is in contact with the introduced liquid is a surface through which the energy acts on the liquid.

The electro-thermal transucer includes a heat generating part comprising a heating resistor layer and a pair of electrodes for applying an electric signal to the heating resistor layer.

The purpose for which the above structure of the recording head has been employed is to make the generated thermal energy as droplet forming energy most effectively and efficiently act on the recording liquid present at the heat action area.

When the composition of the recording liquid requires it, for example, when water is used as the liquid medium for recording liquid, there may be provided on the heating resistor layer at the heat generation part an upper layer for preventing electric leak between the pair of electrodes through the recording liquid as well as for protecting the heating resistor layer against the action of the recording liquid or against thermal oxidation.

With the above described recording head the liquid droplets are formed according to the principle of the liquid jet recording method previously described, which is as follows:

When an electric signal is applied to the electro-thermal transducer, there is produced, as droplet forming energy, an amount of thermal energy which acts on the recording liquid present at the heat action area. By this action there is caused a state change of the recording liquid accompanied with an abrupt increase of its volume. The recording liquid at the heat action area reaches the vaporizable state on a very short time in the order of μsec. As a result, bubbles are formed and grow rapidly in a moment. Thereby the recording liquid existing in the liquid channel between the heat action portion and the orifice is jetted from the orifice in the form of flying liquid droplets.

During the above process of repeated formation and extinction of bubbles, the recording liquid is subjected to the action of high temperature heat which is apt to cause a chemical change of the recording liquid, particularly when there is used a thermally unstable recording liquid. This chemical change of the recording liquid often leads to formation and deposition of insoluble matter in the heat action area. In the worst case, the recording head becomes unable to jet liquid any more. To perform recording for a long time at high speed employing the above recording apparatus, it is essential to set the optimum operational conditions for the recording head while improving the stability of the recording liquid.

As another problem of the above described liquid jet recording method using thermal energy it has also been found that during recording at high speed or during recording for a long time the performance of liquid jet from the recording head sometimes suffers in respect of jet responsiveness, jet efficiency, jet stability, etc. This problem is attributable to undesirable bubble generation in the recording liquid present within the liquid flow channel. During the use of the recording head, there are often generated within the channels undesirable bubbles which may obstruct the flow of recording liquid in the area near the small jet orifice. Also, such undesirable bubbles absorb a part of the liquid jet motive force generated by jetting energy generating means such as a heating resistor. As a consequence of it, the responsiveness of the recording liquid to the signal is reduced. The recording head can no longer jet liquid in a stable manner in response to the applied signal.

Such unfavourable bubble generation is attributable, in substance, to the fact that the motive force for jetting liquid droplets is obtained from the change of state of the recording liquid (especially from the generation of bubbles therein by the action of thermal energy). In view of this fact, it is natural that undesirable bubbles are very easily generated in the process of recording and that the performance of the apparatus including jet responsiveness, jet efficiency and jet stability is easily and greatly affected by such undesirable bubbles.

Once generated, such undesirable bubbles within the heat action area can not disappear in a short time. Rather, the generation of such undesirable bubbles may be accelerated by dissolved gas in the recording liquid.

To solve the problem of generating undesirable bubbles in the recording liquid there have been proposed and used various methods. For example, it is known to use an air-tightly formed liquid reservoir thereby reducing the amount of dissolved gas therein. It is also known to add an oxygen absorber to the recording liquid for purpose of reduction of the dissolved gas. Another known method is to provide a particular bubble exhaust path above the heat action portion of the recording head. The exhaust path is in communication with the heat action area so that the undesirable bubbles flow into the path owing to their own buoyancy and the bubbles can be trapped in the path above the heat action area.

However, it is difficult to obtain satisfactory results from the above known methods. For example, even when the liquid reservoir is made of any air-tight material, gas (air) may penetrate into the reservoir through the material and the amount of dissolved gas in the recording liquid within the reservoir may reach the saturation after a certain time period. The addition of oxygen absorber to the recording liquid may have an adverse effect on the property of the recording liquid.

In the case a recording head used to jet liquid droplets by means of thermal energy, it is desirable that a rapid change of state of the recording liquid be caused for purpose of improvement in responsiveness and efficiency of liquid jet. To this end, sometimes gas is intentionally dissolved in the recording liquid to positively use the dissolved gas for the desired rapid change of state. Therefore, the method useful for reducing the amount of dissolved gas is not always the best method for maintaining the good performance of the recording head.

The provision of a particular bubble trap path above the heat action area of the recording head also has a difficulty in smoothly removing the undesirable bubbles. In this case, the upward movement of the bubbles into the trap path relies upon buoyancy of the bubble only. Since the trap path is very narrow, the bubbles can not be always smoothly removed through the path.

SUMMARY OF THE INVENTION

Accordingly it is an object of the invention to provide a liquid jet recording method according to which the recording can be carried out continuously for a long time at high speed and in a stable manner.

It is another object of the invention to provide a liquid jet recording method which is excellent in jet responsiveness, jet efficiency and jet stability.

It is a further object of the invention to provide a liquid jet recording method which enables one to prolong the useful life of the recording head then used to a great extent and improve the reliability markedly thereby reducing the possibility of trouble and assuring an always stable jet of liquid.

According to one aspect of the present invention, there is provided a liquid jet recording method using a recording head provided with a liquid jet part comprising an orifice through which the liquid is jetted to form a flying liquid droplet and a heat action section in communication with said orifice in which section the thermal energy for jetting the liquid acts on said liquid, and an electro-thermal transducer serving as means for generating the thermal energy, said method characterized in that said thermal energy is made to act on the liquid filling said heat action section so as to jet from said orifice such an amount of liquid as will be sufficient to include unnecessary bubbles generated in said liquid jet part and a liquid droplet is formed by said jetted liquid whereby said unnecessary bubbles are eliminated from said liquid jet part while repeating said liquid droplet formation to perform recording with said droplets.

According to another aspect of the present invention, there is provided a liquid jet recording method using a recording heat provided with a liquid jet part comprising an orifice for jetting liquid through it and a heat action section in communication with said orifice in which section the thermal energy for forming a flying liquid droplet acts on the liquid, and an electro-thermal transducer serving as means for generating thermal energy acting on the liquid filling said heat action section, said method characterized by applying to said electro-thermal transducer a driving signal having a voltage value in the range of 1.02 to 1.3 times as high as the threshold voltage value for bubble generation in said heat action section filled with said liquid.

Other and further objects, features and advantages of the invention will appear more fully from the following description taken in connection with the accompanying drawings.

BRIEF DESCRIPTION OF THE DRAWINGS

FIGS. 1A and 1B illustrate the structure of a recording head pertinent to the present invention wherein FIG. 1A is a partial front view thereof and FIG. 1B is a partial sectional view taken along the chain-dotted line X-Y in FIG. 1A;

DETAILED DESCRIPTION OF THE INVENTION

Figure 1A:
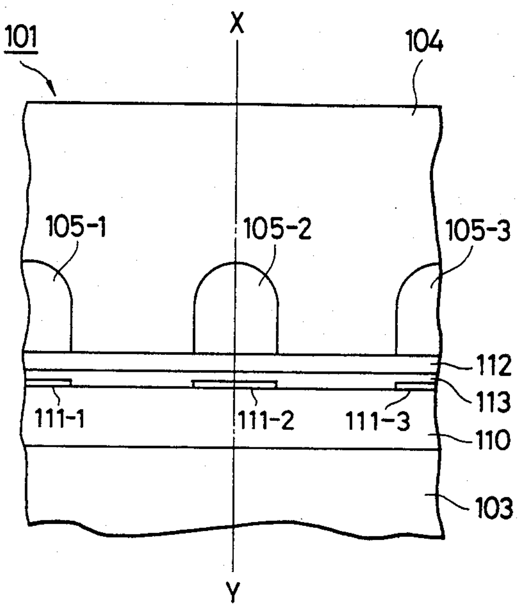
Figure 1B:
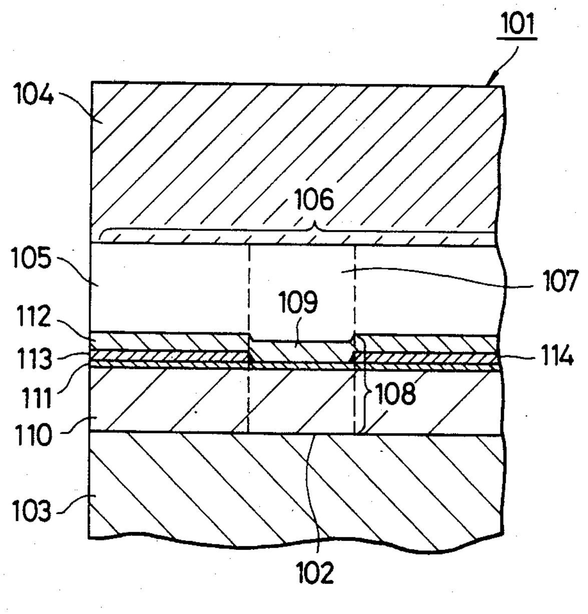

Referring first to FIG. 1, there is shown a liquid jet recording head to which the present invention is applicable. FIG. 1A is a partial front view of the recording head looking in the direction from the orifice side and FIG. 1B is a partial cross-sectional view taken along the line X-Y in FIG. 1A.

The recording head generally designated by 101 is composed of a base plate 103 and a slotted plate 104 jointed together in an overlapped relation. Provided on the base plate 103 is an electro-thermal transducer 102. The slotted plate 104 has a determined number of slots formed on the surface of the plate. The slots have a determined width and a determined depth and are arranged with a determined line density on the surface. When the base plate is covered with the slotted plate and the two plates are jointed together, there are provided between the two plates a determined number of orifices 105 and liquid jet parts 106. While the structure of the recording head is shown to include a plural number of orifices 105, it is to be understood that the application of the present invention is never limited to such multi-orifice structure but the present invention is also applicable to a single orifice recording head.

Every liquid jet part 106 has an orifice 105 at its terminal through which liquid droplets are jetted out. The liquid jet part 106 has also a heat action section or area 107 where the thermal energy generated from the electro-thermal transducer 102 acts on the recording liquid to generate bubbles therein thereby causing an abrupt change of state (phase) of the liquid accompanied with expansion and shrinkage of volume.

The electro-thermal transducer 102 includes a heat generation section 108 having a heat action surface 109 in contact with the recording liquid. The heat action section 107 lies on the heat generation section 108. The heat action surface 109 constitutes the bottom surface of the heat action section 107.

The heat generation section 108 comprises a lower layer 110 provided on the base plate 103, a heating resistor layer 111 formed on the lower layer and a top layer 112 on the heating resistor layer. The heating resistor layer 111 has electrodes 113 and 114 provided on the surface for applying electric current to layer 111. The electrode 113 is common to all of the heat generation sections of the respective liquid jet parts. The electrode 114 is a selective electrode for generating heat from any selected heat generation section of the liquid jet part. The selective electrode is disposed along the flow channel of every liquid jet part 106.

The top layer 112 functions as a protective layer for protecting the heating resistor layer 111 from the chemical and physical attack of the recording liquid then used. By the top layer 112, the heating resistor 111 is isolated from the liquid present in the liquid jet part 106. The top layer 112 serves also to prevent the electrodes 113 and 114 from being short-circuited through the liquid.

If the heating resistor layer 111 is resistant to the attack of the used recording liquid and there is no fear of short-circuit between the electrodes 113 and 114 through the liquid, then the top layer 112 may be omitted completely. In this case, the electro-thermal transducer may be so designed as to include a heating resistor layer 111 whose surface is in direct contact with the liquid.

The primary function of the lower layer 110 is to control the heat flow rate. More particularly, the lower layer is provided to control the flow of heat in the following manner:

During the time of liquid jet, the heat generated from the heating resistor layer 111 is transmitted to the heat action section 107 as much as possible while minimizing the amount of heat flowing toward the side of the base plate 103. After liquid jet, that is, after cutting the current supply to the heating resistor layer 111, the heat remaining in the heat action section 107 and the heat generation section 108 is dissipated away toward the side of the base plate 103 as soon as possible to cool the liquid and the generated bubbles in the heat action section 107 quickly.

With the above structure of liquid droplet jet recording head, the input of electric signals to the electro-thermal transducer 102 is carried out by ON-OFF operation. When an electric signal is applied to the transducer 102, the recording liquid on the heat action surface 109 vaporizes and there are formed effective bubbles for liquid jet. However, at the same time, there are generated also unnecessary small bubbles attributable to dissolved gas in the liquid. These undesirable small bubbles spread into the liquid flow channels of the respective liquid jet part and stay there, which may cause the trouble of unstable liquid jet. In the worst case, the jet of liquid may be blocked completely.

Figure 2:
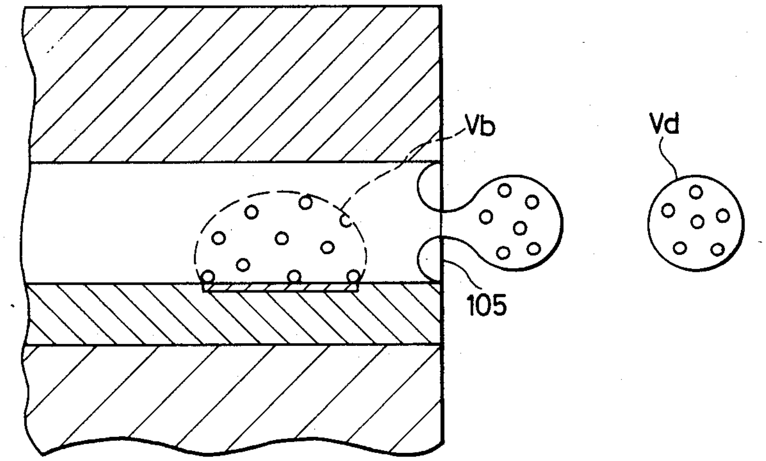
FIG. 2 is a schematic view illustrating a preferred embodiment of the invention.

FIG. 2 schematically illustrates a liquid droplet jetted from the orifice 105.

In FIG. 2, Vb denotes the volume of liquid which the small bubbles generated per unit pulse of the input signal to the transducer 102 can spread through. Vd is the volume of liquid jetted from the orifice 105. As seen from FIG. 2, when Vd is larger than Vb, no undesirable bubbles can stay in the liquid flow channel upstream of the orifice 105. This means that if the driving condition as well as the shape of the recording head are suitably selected for maintaining the above amount of jetted liquid, a stable and continuous liquid jet may be assured without any trouble. Therefore, the quality of the records obtained can be kept good always throughout a long time period of continuous recording.

The method according to the invention enables to realize it, which is described hereinafter with reference to FIG. 3.

Figure 3:
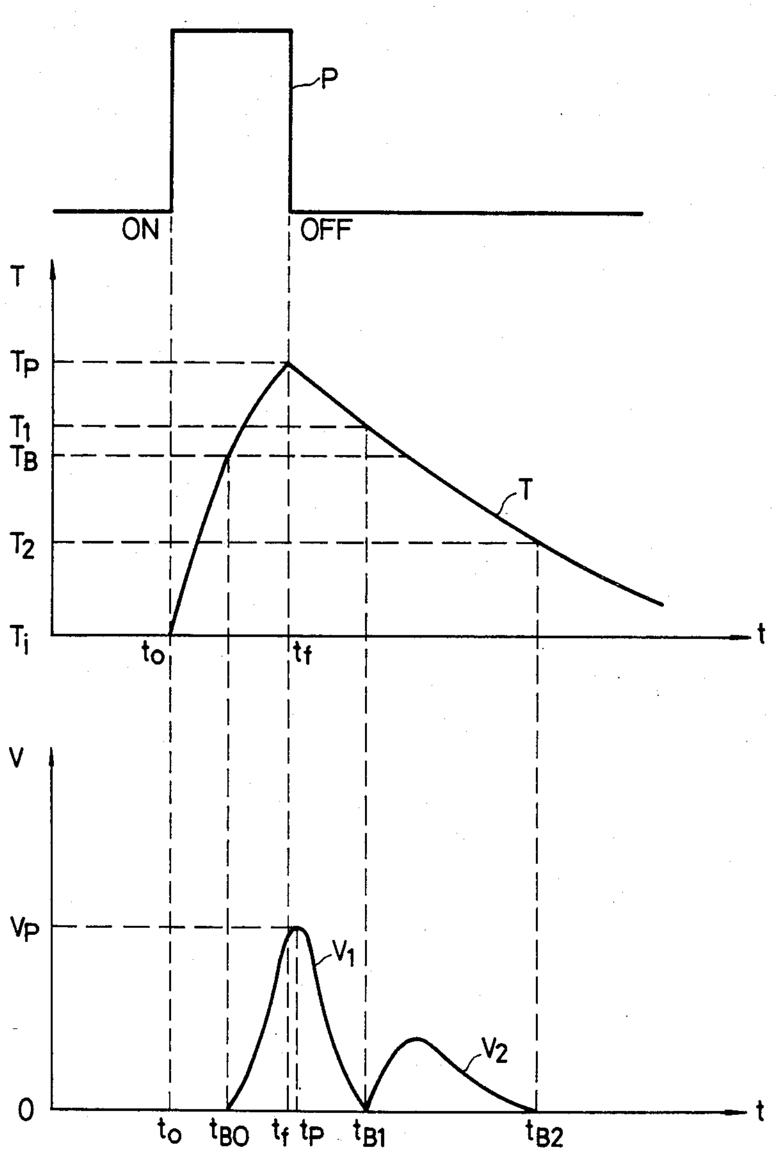
FIG. 3 illustrates another preferred embodiment of the invention.

FIG. 3 is a graph showing the change of the surface temperature on the heat action surface 109 and of the volume of the generated bubble with time as observed when a pulse waveform voltage signal P is applied to the electro-thermal transducer 102 in a recording head 101 as shown in FIGS. 1A and 1B.

At the time point of $t_O$ the electric pulse signal P is put ON and at $t_f$ it is put OFF. With the application of the signal P to the transducer 102, the surface temperature T on the heat action surface 109 starts rising up from the rising start temperature $T_i$ at $t_O$, and the surface temperature T reaches its peak $T_p$ at the time point of $t_f$. The heat action section 107 is filled with a recording liquid having a boiling point of $T_B$. So long as the peak temperature $T_p$ is higher than the boiling point $T_B$ of the liquid in contact with the heat action surface 109, bubbles are generated at the heat action section 107 at the time point of $t_{BO}$ at which $T=T_B$. The volume of the generated bubbles increases with time and reaches its peak $V_p$ at $t_p$. At $t_f$, the electric signal P is switched OFF and the surface temperature T begins to drop. At the same time, the volume of the bubble V decreases. The bubbles disappear at $t_{B1}$.

However, if the surface temperature T on the heat action surface 109 is still higher than the boiling point $T_B$ of the recording head even at the time point $t_{B1}$, then there takes place a secondary bubble generation as indicated by $V_2$. In this case, if the secondary bubble $V_2$ has a sufficient energy to form a flying liquid droplet, the relation of one droplet per one signal may be broken undesirably. Even when the secondary bubble $V_2$ has only an amount of energy insufficient to form a flying liquid droplet, there may be caused some troubles. For example, a small amount of the recording liquid may be pushed out from the orifice 105 or there may be induced an oscillation of the liquid meniscus formed in the vicinity of the orifice 105. Thereby quality of recorded image may be degraded.

The present invention is based on the finding that the above problems of the secondary bubble can be solved and the liquid jet recording of high quality images can be performed more easily and a stable manner by driving the electro-thermal transducer with a driving voltage 1.02–1.3 times as high as the necessary minimum voltage (threshold voltage) for generating bubbles. In summary, according to the invention, the driving voltage Vapp for driving the electro-thermal transducer of the recording head may be set to a value 1.02 to 1.3 times as high as the threshold voltage Vth for bubble generation.

When the driving voltage Vapp is not 1.02 times as high as the threshold voltage Vth, the generated bubbles stay in the flow channel including the heat action section 107 and there are caused various troubles. For example, bubbles staying in the flow channel obstructs the supply of recording liquid and disturbs the smooth flow of liquid for jetting droplets. Bubbles staying on the heat action surface 109 leads to an excessively high temperature at the heating generation section 108. Such unduly elevated temperature shortens the useful life of the transducer. In the worst case, electric breakage of the transducer may be caused by it.

On the other hand, when the driving voltage Vapp is over the level 1.3 times as high as the threshold voltage Vth, there is produced an excess amount of thermal energy, which also shortens the useful life of the transducer. Furthermore, such excess thermal energy produces the trouble that two or more bubbles are generated at the same time to one input signal applied to the electro-thermal transducer. In such case, steady droplet formation is no longer possible.

Therefore, according to the method of the invention, the electro-thermal transducer is driven with the driving voltage Vapp in the range defined above. To attain the object of the invention more effectively, the driving voltage Vapp is preferably set to a value in the range of 1.025 to 1.2 times as high as the threshold value Vth. It has been also found that a better result can be obtained by suitably selecting the pulse width Pw of the driving voltage signal. The preferred range of the pulse width Pw is from 1 to 100 μsec. and especially from 2 to 20 μsec.

Furthermore, a more stable formation of flying droplets can be attained by suitably selecting the temperature rising rate of the heat action surface 109 during heat generation by the electro-thermal transducer 102. In a preferred embodiment of the invention, the driving voltage Vapp and the pulse duration Pw are so selected as to change the surface temperature at the rate of $5\times10^6$ to $5\times10^8$° C./sec. The temperature rising rate is the average temperature/time changing rate during the time from initial temperature Ti to peak temperature $T_p$ of the electro-thermal transducer 102.

Recording liquid used in the invention is basically composed of a coloring agent for giving a color to the recorded image and a liquid medium serving as a solvent in which the coloring agent is dissolved or dispersed. It is recommendable to use those coloring agents which are thermally stable at temperatures in the range used in the apparatus.

Examples of useful coloring agent include dyes, organic pigments and inorganic pigments. As dye those which are soluble in the liquid medium are preferred. Typical examples thereof are direct dye, acid dye and basic dye.

As pigment there may be used almost all of the known pigments provided that they are small in particle size and the irregularity of particle size is as small as possible, and that they have good dispersibility and stability in the liquid medium.

The content of the coloring matter in the recording liquid is determined depending on the kind of liquid medium thus used, the characteristics required for the recording liquid, etc. Generally, the content of coloring agent is in the range of 0.5 to 20 wt%. preferably 0.5 to 15 wt%. and more preferably 1 to 10 wt%. of the total weight of the recording liquid.

In the recording liquid preferably used in the invention, water constitutes the main liquid medium component. Although water may be used alone, it is desirable to use a mixture of water and water soluble organic solvent.

Examples of water soluble organic solvent include:

$C_1$–$C_4$ alkyl alcoholes such as methyl-, ethyl-, n-propyl-, isopropyl-, n-butyl-, sec-butyl-, tert-butyl- and isobutyl alcohols; amides such as dimethylformamide and dimethylacetoamide; ketones and ketoalcohols such as acetone and diacetone alcohol; ethers such as tetrahydrofuran and dioxane; polyalkylene glycols such as polyethylene glycol and polypropylene glycol; alkylene glycols containing 2–6 carbon atoms in the alkylene moiety such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols such as ethylene glycol methyl ether, diethylene glycol methyl (or ethyl) ether, triethylene glycol monomethyl (or ethyl) ether, etc.

Preferred water soluble organic solvents are glycols containing 2 to 8 carbon atoms, especially polyhydric alcohols such as diethylene glycol and lower alkyl ethers of polyhydric alcohols such as triethylene glycol monomethyl (or ethyl) ether.

The content of the above water soluble organic solvent in the recording liquid is generally in the range of 5 to 95 wt%., preferably 1 to 80 wt%. and more preferably 20 to 50 wt%. of the total weight of the recording liquid.

The content of water is variable in a broad range according to the kind and composition of the used solvent component as well as the properties of the recording liquid thus required. However, the content of water is generally in the range of 10 to 90 wt%., preferably 10 to 70 wt%. and more preferably 20 to 70 wt%. of the total weight of the recording liquid.

The recording liquid composed of the above-mentioned components has good and well balanced recording properties (signal responsiveness, stability of droplet formation and jetting, suitability for long and continuous recording and stability of jetting after a long period without recording) and the recording liquid composition per se exhibits excellence in storage stability, fixability to recording material, light fastness of recorded images, weatherability of recorded image and water resistance of recorded images. To further improve the properties of the recording liquid, any known additives may be added to it. As suitable additives, the following conventional additives may be considered:

Viscosity regulators such as polyvinyl alcohol, cellulose and water soluble resin; cationic, anionic and nonionic surface active agents and surface tension regulators such as diethanolamine and triethanolamine; and pH regulators using various buffer solutions.

As readily understood from the foregoing, the ink jet recording method according to the invention has may advantages over the prior art.

Even when recording is carried out continuously for a long time at high speed it is possible to form flying droplets always in a steady manner. The flying direction of the formed droplets and the diameter of the formed droplets are kept constant. Therefore, high quality recording can be attained according to the invention. There is no possibility that the recording liquid may be subject to such chemical change by the heat generated from the electro-thermal transducer, which chemical change may have adverse effect on the state of liquid jet.

Further, according to the liquid jet recording method of the present invention, the liquid droplets can be formed in faithful response to the input signal to the electro-thermal transducer. This assures the relation of one droplet per one signal and the uniformity of droplet flying speed.

According to the liquid jet recording method of the invention, the voltage value of the voltage signal applied to the electro-thermal transducer (driving voltage Vapp) is set to a value which is 1.02 to 1.3 times as high as the necessary minimum value of the voltage signal for bubble generation in the heat action section filled with recording liquid (threshold voltage Vth). This prevents the generation of unnecessarily large thermal energy from the transducer. Consequently, the generated thermal energy is most effectively used to form a bubble useful for a desired flying droplet. In addition, the generation, growth and shrinkage of bubbles faithfully respond to the input signal to the electro-thermal transducer. Further, when the electro-thermal transducer is driven by application of driving signal having a voltage value which is in the range of 1.02 to 1.3 times the threshold voltage, an amount of liquid enough to include unnecessary bubbles generated in the liquid jet part can be jetted as a flying liquid droplet from the orifice.

To illustrate the invention the following examples are given.

EXAMPLE 1

A recording head was prepared in the following procedure using a silicon substrate as the base plate of the head:

At first, a $SiO_2$ layer (lower layer) 3 μm thick was formed on the silicon substrate by sputtering. Thereafter, a layer of $HfB_2$ of 1000 Å thickness was coated thereon as a heating resistor layer and then a layer of aluminum 3000 Å thick was overlaid on it as an electrode. Subsequent to the coating, a heating resistor pattern was formed by selective etching. As a protecting layer (top layer), a layer of $SiO_2$ 0.5 μm thick was overlaid on it by sputtering. After forming an electro-thermal transducer on the substrate in the above manner, a glass plate having slots formed thereon was joined to the base plate with the heating resistor being in alignment with the slot. The size of the slot was 80 μm width × 80 μm depth. After joining the two plate members together, the orifice end surface was ground so as to set the distance between the force end of the heating resistor and the orifice to 300 μm. Thus, a recording head was prepared.

Experiments of image recording were conducted using the recording head. In the experiments, a black ink mainly composed of a black dye and ethanol was supplied to the heat action section of the head with a back pressure of 0.01 atm. Applied to the electro-thermal transducer was a rectangular voltage pulse print signal.

Figure 4:
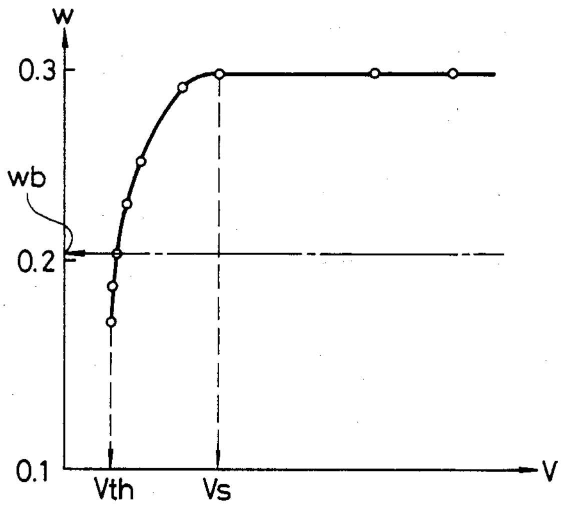
FIGS. 4 and 5 are graphs showing the results obtained from the embodiments respectively.
Figure 5:
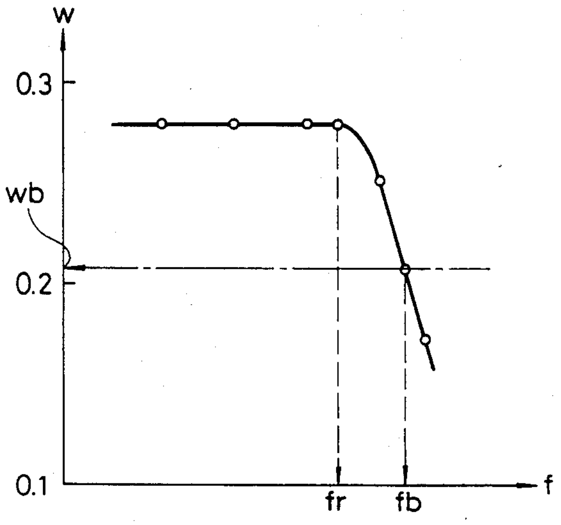

The driving conditions (voltage and frequency) by which the amount of ink jetted is determined were varied to determine the relation between the amount of jetted ink and the formation of undesirable staying bubbles. FIG. 4 shows the relation between voltage and amount of ink jetted. FIG. 5 shows the relation between frequency and amount of ink jetted.

In the experiments, it has been found that when the amount of ink jetted is less than 0.21 μg/pulse (=wb), undesirable bubbles stay in the ink channel and the ink jet becomes unstable irrespective of driving condition. A sufficient jetting power to eliminate the undesirable bubbles was obtained when the applied voltage reached the level Vs which is 1.02 times or more as high as the threshold voltage Vth. Under the condition, no undesirable bubble staying in the ink channel was observed and the jet of ink was performed in a very stable manner without any trouble for a long period.

When the driving frequency was higher than $f_b$ (FIG. 5), the supply of ink could not overtake the consumption. Because of it, there were produced undesirable bubbles staying in the ink channel and the jet of ink became unstable.

From the result of our many experiments it has been found that when fr (Hz) > 1000 (Hz), there holds the following relation between $f_b$ and $f_r$:

$$f_b \approx (f_r)^2/680$$

wherein, $f_b$ and $f_r$ have no dimension and values expressed in terms of Hz are used for them.

Under the condition where $f_b$ is lower than $f_r$, the amount of ink jetted was kept constant and, when the applied voltage was at a proper level as described above, there was observed no bubble staying in the ink channel. Therefore, always good and stable jet of ink was attained and the quality of images obtained was the best.

As for voltage it has been found that when the applied voltage is increased beyond the threshold voltage Vth required for obtaining wb, the amount of ink jetted also increases with the increase of the applied voltage

TABLE 2

| Heater size | Orifice width | Channel length | Vth (V) | Vc (V) | Vs (V) | fr (KHz) | fb (KHz) | wb (μg/pulse) | Sample No. |
|---|---|---|---|---|---|---|---|---|---|
| A | a | α | 27.6 | 29.0 | 33.0 | 1.6 | 3.7 | 0.13 | 1-1 |
| | | β | 27.7 | 29.0 | 33.2 | 0.8 | 1.0 | 0.13 | 1-2 |
| | | γ | 27.7 | 29.0 | 33.1 | 0.4 | 0.42 | 0.13 | 1-3 |
| | b | α | 27.5 | 28.9 | 33.0 | 1.5 | 3.2 | 0.17 | 1-4 |
| | | β | 27.5 | 28.9 | 33.1 | 0.8 | 1.0 | 0.17 | 1-5 |
| | | γ | 27.4 | 28.9 | 33.0 | 0.4 | 0.42 | 0.17 | 1-6 |
| | c | α | 27.2 | 28.5 | 32.6 | 1.3 | 2.5 | 0.21 | 1-7 |
| | | β | 27.3 | 28.6 | 32.8 | 0.7 | 0.8 | 0.21 | 1-8 |
| | | γ | 27.2 | 28.5 | 32.7 | 0.4 | 0.42 | 0.21 | 1-9 |
| B | a | α | 23.4 | 24.6 | 28.1 | 1.9 | 5.3 | 0.12 | 1-10 |
| | | β | 23.4 | 24.6 | 28.1 | 1.0 | 1.5 | 0.11 | 1-11 |
| | | γ | 23.4 | 24.6 | 28.2 | 0.5 | 0.55 | 0.12 | 1-12 |
| | b | α | 23.2 | 24.4 | 27.9 | 1.7 | 4.2 | 0.15 | 1-13 |
| | | β | 23.3 | 24.4 | 27.9 | 0.9 | 1.2 | 0.15 | 1-14 |
| | | γ | 23.3 | 24.4 | 27.9 | 0.5 | 0.55 | 0.15 | 1-15 |
| | c | α | 23.1 | 24.2 | 27.7 | 1.5 | 3.3 | 0.18 | 1-16 |
| | | β | 23.1 | 24.2 | 27.7 | 0.8 | 1.0 | 0.18 | 1-17 |
| | | γ | 23.1 | 24.3 | 27.8 | 0.4 | 0.43 | 0.19 | 1-18 |

TABLE 3

| Heater size | Orifice width | Channel length | Vth (V) | Vc (V) | Vs (V) | fr (KHz) | fb (KHz) | wb (μg/pulse) | Sample No. |
|---|---|---|---|---|---|---|---|---|---|
| C | a | α | 18.3 | 19.2 | 21.9 | 2.1 | 6.3 | 0.10 | 1-19 |
| | | β | 18.2 | 19.1 | 21.9 | 1.2 | 2.1 | 0.10 | 1-20 |
| | | γ | 18.3 | 19.2 | 21.0 | 0.6 | 0.7 | 0.10 | 1-21 |
| | b | α | 18.2 | 19.1 | 21.8 | 1.9 | 5.3 | 0.13 | 1-22 |
| | | β | 18.1 | 19.1 | 21.7 | 1.0 | 1.5 | 0.13 | 1-23 |
| | | γ | 18.1 | 19.1 | 21.7 | 0.5 | 0.55 | 0.13 | 1-24 |
| | c | α | 18.0 | 18.9 | 21.6 | 1.7 | 4.2 | 0.16 | 1-25 |
| | | β | 18.1 | 19.0 | 21.7 | 0.9 | 1.2 | 0.16 | 1-26 |
| | | γ | 18.0 | 18.9 | 21.6 | 0.5 | 0.55 | 0.16 | 1-27 |

and that the increase of the amount of ink jetted stops and reaches its saturation value approximately when the applied voltage reaches the level 1.3 times as high as Vth. In FIG. 4, Vs shows such level of the applied voltage.

At the voltage Vs, both the state of ink jet and the quality of print were very good.

Employing the basic arrangement shown in FIG. 1, many samples of recording heads having different sizes as shown in Table 1 were prepared and a series of recording experiments were conducted to evaluate the performance of the recording heads with respect to the presence or absence of undesirable bubbles staying in the ink channel as well as the quality of recorded images. The results are shown in Table 2 and Table 3.

The result demonstrates that undesirable bubbles can be eliminated from the ink channel and high quality images can be obtained when the recording head is driven under the driving conditions where the frequency $f_b$ (Hz) is less that $(f_r)^2/680$ and the applied voltage Vapp is in the range of 1.02 to 1.3 times higher than the threshold voltage Vth, no matter what shape and size the head may have.

TABLE 1

| | |
|---|---|
| Heater size | (A) 200 μm × 40 μm |
| | (B) 150 μm × 40 μm |
| | (C) 100 μm × 40 μm |
| Channel shape | (a) 200 μm × 80 μm |
| | (b) 150 μm × 80 μm |
| | (c) 80 μm × 80 μm |
| Channel length | (α) 2 mm |
| | (β) 4 mm |
| | (γ) 8 mm |

EXAMPLE 2

Employing the basic arrangement shown in FIG. 1, samples of recording head (Samples A to E) were prepared which had different structures as shown in Table 4.

Using different kinds of ink a to e shown in Table 5, a series of recording experiments were conducted with the recording heads. The state of jet of ink droplet at various driving voltages Vapp was evaluated by the quality of print in the manner described later.

Table 6 shows the results obtained when the recording heads, Samples A to E were used with the ink a while varying the driving voltage Vapp in the range of 1.0 to 1.5 times as high as the threshold voltage Vth. The found values of Vth for Samples A to E are also shown in Table 6.

Table 7 shows the results obtained when the different inks b, c, d and e were used for the same recording head, Sample A.

Table 8 shows the results obtained when the pulse width of the driving signal was varied in the range of 0.1 to 500 μsec. While setting the driving voltage to the same value, 1.15×Vth.

Table 9 shows the results obtained when both the driving voltage Vapp and the pulse width Pw were varied for the same combination of recording head A and ink a.

In both Tables 6 and 7, the pulse width was 10 μs.

Evaluation was made by examining the quality of obtained print and grading it in accordance with the following grading standard:

◎ . . . very good
○ . . good
Δ . . . acceptable for practical purpose
X . . . unacceptable for practical purpose Tables 6 through 9 demonstrate that good results are obtained when Vapp of the voltage signal is set to a value in the range of from 1.02×Vth to 1.3×Vth and that better results can be obtained when the pulse width of the voltage signal is set to a value in the range of from 1 to 100 sec.

TABLE 5-continued

| Component | Ink a | Ink b | Ink c | Ink d | Ink e |
|---|---|---|---|---|---|
| Supranol Fast Black VLG | | | | 4 | |
| Solar Fast Red 3G | | | 3 | | |
| Victoria Pure Blue BOH conc. | | 5 | | | |

TABLE 6

Pw = 10 μs

| Head (sample No.) | Ink | Vth(V) | Evaluation of print Vapp(V), xVth: 1.0 | 1.02 | 1.05 | 1.08 | 1.1 | 1.15 | 1.2 | 1.3 | 1.4 | 1.5 |
|---|---|---|---|---|---|---|---|---|---|---|---|---|
| A | a | 28 | X | Δ | ○ | ◎ | ◎ | ◎ | ○ | Δ | X | X |
| B | a | 28 | X | Δ | ○ | ◎ | ◎ | ◎ | ○ | Δ | X | X |
| C | a | 28 | X | Δ | ○ | ◎ | ◎ | ◎ | ○ | Δ | X | X |
| D | a | 29 | X | Δ | ○ | ◎ | ◎ | ◎ | ○ | Δ | X | X |
| E | a | 38 | X | Δ | ○ | ◎ | ◎ | ◎ | ○ | Δ | X | X |

TABLE 7

Pw = 10 μs

| Head (sample No.) | Ink | Vth(V) | Evaluation of Print Vapp(V), xVth: 1.0 | 1.02 | 1.05 | 1.08 | 1.1 | 1.15 | 1.2 | 1.3 | 1.4 | 1.5 |
|---|---|---|---|---|---|---|---|---|---|---|---|---|
| A | b | 25 | X | Δ | ○ | ◎ | ◎ | ◎ | ○ | Δ | X | X |
| A | c | 28 | X | ○ | ○ | ◎ | ◎ | ◎ | ○ | Δ | X | X |
| A | d | 28 | X | ○ | ○ | ◎ | ◎ | ◎ | ○ | Δ | X | X |
| A | e | 27.5 | X | ○ | ○ | ◎ | ◎ | ◎ | ○ | Δ | X | X |

TABLE 4

| Compositon of head | Recording Head: Sample A | Sample B | Sample C | Sample D | Sample E |
|---|---|---|---|---|---|
| base plate | single crystal silicon substrate | polycrystal-line silicon substrate | ceramics | glass sub-strate | single crystal silicon sub-strate |
| lower layer | $SiO_2$(2.5 μ) | $SiO_2$(2.5 μ) | glass layer | none | $SiO_2$(0.5 μ) |
| heating resistor layer (1500Å) | $HfB_2$ | $HfB_2$ | $HfB_2$ | $HfB_2$ | $HfB_2$ |
| electrode layer (5000Å) | Al | Al | Al | Al | Al |
| upper layer (1.5 μ) | $SiO_2$ | $SiO_2$ | $SiO_2$ | $SiO_2$ | $SiO_2$ |

TABLE 5

| Component | Ink a | Ink b | Ink c | Ink d | Ink e |
|---|---|---|---|---|---|
| water | 50 | 20 | 60 | 65.7 | 35 |
| DEG diethylene glycol | 30 | | | 20 | |
| NMP N—methyl-2-pyrrolidone | 15 | | | | 15 |
| TEA triethanolamine | | 15 | 9 | 10 | |
| TEGMM triethylene glycol monomethyl ether | | 10 | 9 | | 20 |
| MeCe ethylene glycol monomethyl ether | | 40 | 9 | | |
| EtOH ethanol | | 10 | | | |
| PEG -200 polyethylene glycol 200 | | | 10 | | 24 |
| dibutylnaphthalene sodium sulfonate | | | | 0.2 | |
| 6-acetoxy-2,4-dimethyl-dioxane | | | | 0.1 | |
| Direct Fast Black D | 5 | | | | 6 |

TABLE 8

$V_{app} = 1.15 \times V_{th}$

| Head (sample No.) | Ink (No.) | Pulse width (μsec): 0.1 | 0.5 | 1 | 3 | 5 | 10 | 25 | 50 | 100 | 500 |
|---|---|---|---|---|---|---|---|---|---|---|---|
| A | a | Δ | ○ | ○ | ◎ | ◎ | ◎ | ◎ | ○ | Δ | X |
| | b | Δ | ○ | ○ | ◎ | ◎ | ◎ | ◎ | ○ | Δ | X |
| | c | Δ | ○ | ○ | ◎ | ◎ | ◎ | ◎ | ○ | Δ | X |
| | d | Δ | ○ | ○ | ◎ | ◎ | ◎ | ◎ | ○ | Δ | X |
| | e | Δ | ○ | ○ | ◎ | ◎ | ◎ | ◎ | ○ | Δ | X |
| B | a | Δ | ○ | ○ | ◎ | ◎ | ◎ | ○ | ○ | Δ | X |
| | b | Δ | ○ | ○ | ◎ | ◎ | ◎ | ○ | ○ | Δ | X |
| | c | Δ | ○ | ○ | ◎ | ◎ | ◎ | ○ | Δ | Δ | X |
| | d | Δ | ○ | ○ | ◎ | ◎ | ◎ | ○ | ○ | Δ | X |
| | e | Δ | ○ | ○ | ◎ | ◎ | ◎ | ○ | ○ | Δ | X |
| C | a | Δ | ○ | ○ | ◎ | ◎ | ◎ | ◎ | ○ | Δ | X |
| | b | Δ | ○ | ○ | ◎ | ◎ | ◎ | ◎ | ○ | Δ | X |
| | c | Δ | Δ | ○ | ◎ | ◎ | ◎ | ◎ | ○ | Δ | X |
| | d | Δ | ○ | ○ | ◎ | ◎ | ◎ | ◎ | ○ | Δ | X |
| | e | Δ | ○ | ○ | ◎ | ◎ | ◎ | ◎ | ○ | Δ | X |
| D | a | Δ | ○ | ○ | ◎ | ◎ | ◎ | ○ | ○ | Δ | X |
| | b | Δ | ○ | ○ | ◎ | ◎ | ◎ | ◎ | ○ | Δ | X |
| | c | Δ | ○ | ○ | ◎ | ◎ | ◎ | ◎ | ○ | Δ | X |
| | d | Δ | ○ | ○ | ◎ | ◎ | ◎ | ○ | ○ | Δ | X |
| | e | Δ | ○ | ○ | ◎ | ◎ | ◎ | ◎ | ○ | Δ | X |
| E | a | Δ | ○ | ○ | ◎ | ◎ | ◎ | ◎ | ○ | Δ | X |

TABLE 8-continued

| Head (sample No.) | Ink (No.) | $V_{app} = 1.15 \times V_{th}$ Pulse width (μsec) 0.1 | 0.5 | 1 | 3 | 5 | 10 | 25 | 50 | 100 | 500 |
|---|---|---|---|---|---|---|---|---|---|---|---|
| | b | Δ | O | O | ◎ | ◎ | ◎ | ◎ | O | Δ | X |
| | c | Δ | O | O | ◎ | ◎ | ◎ | ◎ | O | Δ | X |
| | d | Δ | O | O | ◎ | ◎ | ◎ | ◎ | O | Δ | X |
| | e | Δ | O | O | ◎ | ◎ | ◎ | ◎ | O | Δ | X |

TABLE 9

| n | Pw (μs) 1 | 3 | 5 | 10 | 25 | 50 | 75 |
|---|---|---|---|---|---|---|---|
| 1.00 | X | X | X | X | X | X | X |
| 1.05 | O | O | O | O | O | Δ | X |
| 1.10 | ◎ | ◎ | ◎ | ◎ | O | Δ | X |
| 1.15 | O | ◎ | ◎ | ◎ | ◎ | O | O |
| 1.20 | O | ◎ | O | O | Δ | X | X |
| 1.30 | Δ | O | O | O | X | X | X |
| 1.50 | X | O | Δ | Δ | X | X | X |

$V_{app}$ = nVth(V), recording head A
ink a

What we claim is:

1. A liquid jet recording method for projecting droplets of liquid, the method comprising the steps of:

providing a liquid jet recording head having an inlet, an orifice from which droplets of liquid are projected, a liquid flow path between the inlet and the orifice, and an electro-thermal transducer for heating liquid in a heat acting section of the liquid flow path;

repeatedly applying a driving signal to said electro-thermal transducer to generate heat in the heat acting section, thereby creating vapor bubbles in the liquid therein to repeatedly project droplets of liquid from the orifice and creating residual bubbles in the liquid therein which remain in the liquid flow path after the vapor bubbles collapse;

supplying liquid to the inlet of the liquid flow path to replace the liquid projected as droplets from the orifice; and controlling the amount of heat generated by the electro-thermal transducer substantially to prevent the accumulation of residual bubbles in the liquid flow path by providing droplets large enough to promote flow of the residual bubbles downstream from the heat acting section as droplets are projected from the orifice.

2. A liquid jet recording method according to claim 1 in which the driving signal is repeatedly applied at a frequency no higher than that which enables liquid to be supplied to the inlet to replace the amount of liquid projected as droplets from the orifice.

3. A liquid jet recording method according to claim 1 in which the driving signal has a voltage from about 1.02 to 1.3 times the minimum voltage required to vaporize the liquid in the liquid flow path.

4. A liquid jet recording method according to claim 1 in which the liquid in the heat acting section is supplied through a supply port in the liquid jet recording head.

5. A liquid jet recording method according to claim 1 in which the pulse width of the driving signal is in the range of from 1 to 100 μsec.

6. A liquid jet recording method according to claim 5 in which the pulse width of the driving signal is in the range of from 2 to 20 μsec.

7. A liquid jet recording method according to claim 1 in which the electro-thermal transducer is mechanically connected with the heat acting section.

* * * * *